Sept. 19, 1967     W. EBBINGE     3,342,045
AUTOMATIC WASHING MACHINE PROGRAM CONTROLLER
Filed Aug. 12, 1965     2 Sheets-Sheet 1

INVENTOR
WILLEM EBBINGE
BY
Frank R. Trifari
AGENT

United States Patent Office 3,342,045
Patented Sept. 19, 1967

3,342,045
AUTOMATIC WASHING MACHINE
PROGRAM CONTROLLER
Willem Ebbinge, Emmasingel, Eindhoven, Netherlands, assignor to North American Philips Company, Inc., New York, N.Y., a corporation of Delaware
Filed Aug. 12, 1965, Ser. No. 479,177
Claims priority, application Netherlands, Aug. 13, 1964, 64—9,310
10 Claims. (Cl. 68—12)

This invention relates to automatic washing machines, and more particularly to a washing machine having a program controller which provides a washing program consisting of a cycle of successive actions.

A washing cycle usually consists of the following operations:
 (1) Filling the washing machine with washing water,
 (2) Heating the contents of the machine to the desired temperature,
 (3) The actual washing process,
 (4) Emptying the machine.

Each separate action, once started, runs off automatically.

It is an object of the invention to cause the whole program to be performed with only one single starting action. For that purpose the invention features a plurality of optical coupling arrangements intercoupling preceding and succeeding switching stages. The switching stages are each responsible for a preceding and a succeeding operation, respectively, and the optical coupling arrangements cause a preceding phase of the cycle to be ended and a following phase to be started.

Figure 1:
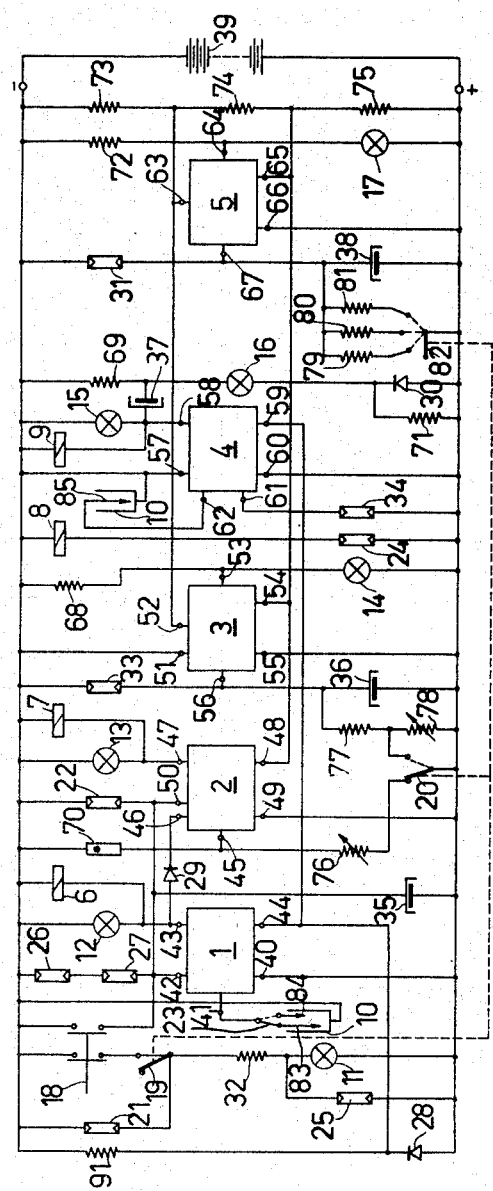

In order that the invention may readily be carried into effect it will now be described in greater detail, by way of example with reference to the accompanying drawing, in which, FIGURE 1 is a circuit diagram of a washing machine program controller according to the invention, and FIGURES 2, 3, 4 and 5 show details of the electric circuits labelled 1-4 in FIGURE 1.

In FIGURE 1, a voltage source 39 energizes the parallel arrangement of a number of separate circuits which each perform a given function and which are coupled together by the co-operation of light sources and photosensitive resistors in a manner such that the desired actions are preformed in the correct sequence.

The switches 19, 20, 23 and 82 assume the positions shown by the solid lines.

When the push button 18 is moved from the position shown to the right-hand side, the circuit 1 is switched on and consequently the relay 6 is energized. The relay 6 operates to control the supply of water to the container 10 which is filled to a height indicated by the arrow 83.

The light source 12 is connected parallel to the relay coil 6 and illuminates a photo-sensitive resistor 22, which bridges one pair of contacts of the push button 18 in the closed condition. The task of these contacts, namely setting up the desired voltage at the terminal 42 of the circuit 1, then is taken over by the resistor 22. The resistor 22 ensures that the push button 18, after the short movement from the position shown to the right-hand side, can return to and then remain in the position shown.

When the desired height of the washing water in the container 10 is reached, the relay coil 6 and the lamp 12 substantially pass no current because at this time the circuit 1 is switched to its second state so that little or no current is supplied to the terminal 43. The diode 29 becomes nonconducting when the voltage drop across the lamp 12 is negligible and the circuit 2 then passes from its one stable condition into its other stable condition. The relay 7 is energized and the light source 13 which is connected parallel to the relay coil 7 is also energized.

The lamp 13 illuminates the photo-sensitive resistor 22 which becomes conductive, keeps the terminal 50 at the required voltage and ensures that the push button 18 can remain in the position shown.

A resistor 70, which has a negative temperature coefficient, is thermally coupled directly to the washing water and forms a potentiometer with the variable resistor 76. When the washing water has reached the desired temperature, which can be adjusted with the variable resistor 76, the voltage at the terminal 45 is such that the circuit 2 again returns to the rest condition, that is to say the light source 13 and the relay coil 7 pass no current.

Both during the filling of the container 10 and during the heating of the washing water, a photo-sensitive resistor 33, which is in optical contact both with the light source 12 and with the light source 13, is low-ohmic. Consequently, a capacitor 36 is charged through the resistor 33.

The circuit 3 is constructed so that initially the current available at the terminal 53 is negligible. At this time the light source 14, which is supplied via the resistor 68 from the voltage source 39, is ignited. The junction of the resistor 68 and the light source 14 is connected to the terminal 53. The photo-sensitive resistors 24 and 34 illuminated by the lamp 14 are low-ohmic. The relay 8 of the washing motor is connected in series with the resistor 24 and is energized.

When the washing water has reached the desired temperature, the photo-sensitive resistor 33 suddenly becomes high-ohmic since light source 13 is now de-energized. The capacitor 36 begins to discharge through a network which contains the series arrangement of resistors 77 and 78 in shunt with the capacitor 36. The discharge time may be said to be equal to the washing and is adjusted by means of the variable resistor 78. When the capacitor 36 is wholly or for the greater part discharged, the potential of the terminal 56 assumes a value which influences the circuit 3 so that the said circuit presents current to the terminal 53. The voltage drop which the said current produces across the resistor 68 gives the terminal 53 a potential which is insufficient to keep the light source 14 ignited. Consequently, the photo-sensitive resistors 24 and 34 optically coupled thereto become high-ohmic. The washing motor relay 8 is switched off because the resistor 24 becomes non-conductive. Furthermore as a result of the resistance variation of the resistor 34, the circuit 4 passes into the condition in which the terminal 58 assumes a potential such that the pumping relay 9 is energized.

The container 10 is emptied. During emptying the terminal 62 is connected to the negative terminal of the voltage source 39 via the contact 85. This connection is interrupted when the container 10 is entirely, or substantially entirely, empty. The potential of the terminal 62 now assumes a value such that the circuit 4 passes into the condition in which the terminal 58 assumes a potential which causes a negligible voltage drop across the relay coil 9. The relay 9 is switched off.

The described operation of thte various circuits guarantees that the program is finished in a reliable manner because the supply voltages reach the circuits through photo-sensitive resistors which become high-ohmic when the associated circuit has to be switched off.

Figure 2:
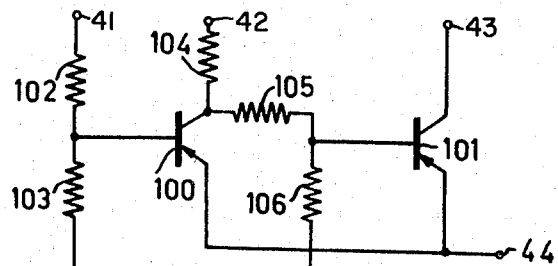

FIGURE 2 shows the circuit 1 in greater detail. The transistor 100 is non-conductive when the terminal 41 is floating, that is when the water level in the container 10 has not yet reached the desired value. The transistor 101 is conductive so that at the terminal 43 a current becomes available which ignites the light source 12 and switches on the relay 6. When the desired water level is reached, the terminal 41 is directly connected to the negative terminal of the voltage source 39. The potentiometer 102, 103 now sets up a potential at the base of the transistor 100 such that the transistor becomes conductive. A voltage drop is set up in turn across the resistor 104 which increases the base potential of the transistor 101. The transistor 101 becomes non-conductive and the relay 6 is de-energized.

Figure 3:
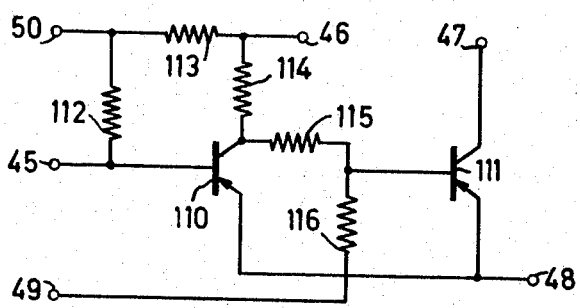

FIGURE 3 shows the circuit 2 which cooperates with the temperature-sensitive resistor 70 to heat the contents of the container 10 to the desired temperature. When the temperature of the washing water is low, the base of the transistor 110, which is connected to the junction 45 of the temperature-sensitive resistor 70 and the resistor 76, which resistors form a potentiometer, is at a positive potential with respect to its emitter. The transistor 110 is non-conducting, the transistor 111 on the contrary does conduct. The collector current of the transistor 111 energizes the relay 7 which switches on the heating element.

When the temperature of the washing water has reached the desired value, the resistance of the temperature-sensitive resistor 70 has decreased to a low value. A negative potential is applied to terminal 45, and consequently to the base of the transistor 110, such that the transistor 110 becomes conductive. The voltage drop across the resistor 114 produced by the flow of collector current varies the base potential of the transistor 111 in a manner such that the said transistor passes into the non-conductive condition. The relay 7, which is connected to terminal 47, is deenergized.

Figure 4:
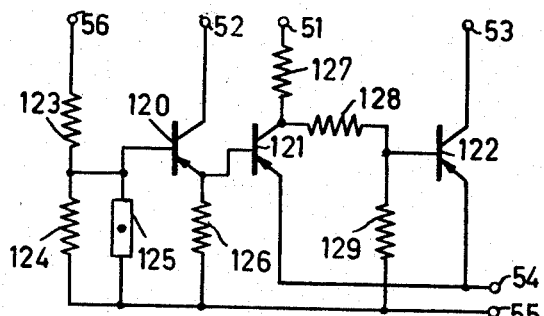

FIGURE 4 shows the circuit 3 which, together with the capacitor 36 connected to the terminal 56 and the photo-sensitive resistor 33, determines the washing time. The washing cycle begins when the photo-sensitive resistor 33 assumes a high-ohmic value, i.e. when the washing water has reached the desired temperature. At that instant the base of the transistor 120 has a potential which is negative with respect to the emitter potential. The transistor 120 is conductive as is the transistor 121. The voltage drop across the resistor 127 is large so that the base potential of the transistor 122 is positive with respect to the emitter potential. The transistor 122 is cut off and the voltage at the terminal 53 is determined only by the resistor 68 and the resistance of the light source 14.

During the washing cycle the capacitor 36 discharges through the parallel arrangement of the part of the network consisting of the resistors 123, 124 and 125 and of the part of the network consisting of the resistors 77 and 78. The base potential of the transistor 120 increases during the discharge of the capacitor 36. When the capacitor has discharged, the base potential of the transistor 120 becomes so high that the transistor 120, and consequently also the transistor 121, passes into the cut off condition. The voltage drop across the resistor 127 caused by the flow of collector current in transistor 121 disappears, completely, or substantially completely, so that the base potential of the transistor 122 becomes more negative. The transistor 122 becomes conductive and causes a voltage drop across the resistor 68 which is connected to terminal 53. This in turn reduces the voltage across the light source 14 to a very low value.

Figure 5:
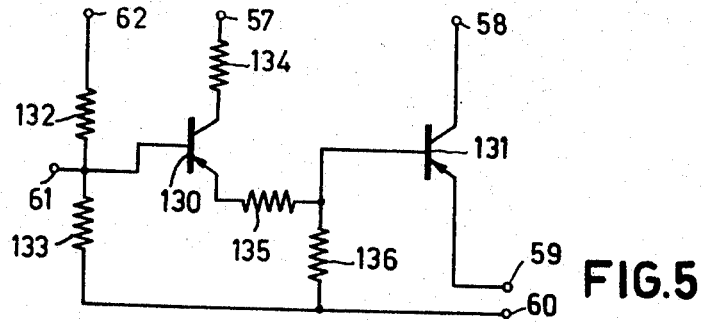

FIGURE 5 shows the circuit 4 by means of which the emptying of the container 10 takes place. The photo-sensitive resistor 34 connected parallel to the resistor 133 is low-ohmic during the filling, heating and washing cycles because the lamp 14, which radiates resistor 34, is then ignited. The transistor 130 is cut off because its base is connected to the positive terminal of the voltage source 39 via the substantially negligible resistor 34. The transistor 131 is non-conductive for the same reason. However, at the end of the washing cycle the resistor 34 becomes high-ohmic. The potentiometer 132, 133 is chosen so that the base potential is decreased and the transistor 130 becomes conductive. As a result of the voltage drop produced across the resistor 136 by the emitter current of transistor 130, the transistor 131 also becomes conductive.

The relay 9 is energized and the emptying of the container 10 begins.

When the container 10 is emptied, the terminal 62 is no longer connected to the negative terminal of the voltage source 39. The base potential of the transistor 130 becomes more positive. The transistor 130, and consequently the transistor 131, pass into the cut off condition. The relay 9 returns to the rest condition.

As shown in FIGURE 1, the capacitor 35 is connected parallel to both the input of the circuit 1, which controls the filling of the container 10, and to the input of the circuit 2, which controls the heating of the washing water. The object of the said capacitor 35 is to bridge the transition time between the end of the filling phase and the beginning of the heating phase. In fact, the photo-sensitive resistor 22 is no longer illuminated by the light source 12 in that time interval and is not yet illuminated by the light source 13. Now the capacitor 35 for a short period holds the terminal 50 at the potential which is required to cause the lamp 13 to ignite, which then takes over the task of the capacitor 35.

The object of the diode 29, connected between the output terminal 43 of the circuit 1 and the input terminal 46 of the circuit 2, is to switch off the heating relay 7 when the circuit 1 again passes into the condition in which the relay 6 is energized. This latter situation occurs in the event the water level in the container 10 falls.

In a given embodiment of the invention, the photo-sensitive resistors 21, 22, 24, 25, 26, 27, 33 and 34 were of an experimental type. The lamps 11, 14, 16 and 17 had an operating voltage of 6 v. and an associated current of 40 ma. The lamps 12, 13 and 15 had an operating voltage of 24 v. and an associated current of 40 ma. The diodes 29 and 30 were of the type OA85 and the diode 28 was of the type OA210. The resistors 31, 32, 68, 69, 71, 72, 73, 74 and 75 were 470, 330, 470, 1500, 1000, 470, 220, 18 and 7Ω, respectively. The capacitors 35, 36 and 38 were 250, 1000 and 1000 μf., respectively. The voltage source 39 supplied a voltage of 24 v.

The transistors 100, 101, 110, 111, 120, 121, 122, 130 and 131 were of an experimental type. The resistors 102, 103, 104, 105 and 106 were 10, 3.9, 5.6, 1.8 and 1.8KΩ, respectively. The resistors 112, 113, 114, 115 and 116 were 150KΩ, 2.7KΩ, 2.7KΩ 100 and 470Ω, respectively. The resistors 123, 124, 126, 127, 128 and 129 were 330, 270, 4.7, 8.2, 3.3 and 4.7KΩ, respectively. The resistors 132, 133, 134, 135 and 136 were 10KΩ, 3.9KΩ, 4.7KΩ, 470Ω and 470Ω, respectively.

It is possible to perform a washing program for a washing machine by means of a relatively low voltage in the range of 24 volts.

What is claimed is:

1. A program controller for actuating a washing machine through a cycle of successive operations comprising, a source of supply voltage, first, second, third and fourth switching circuits for successively controlling the filling, heating, washing and draining operations, respectively, of said washing machine, each of said switching circuits having an operative state and a rest state, first, second, third and fourth relay means individually coupled to the output circuits of said first, second, third and fourth switching circuits, respectively, and arranged to control the intake of water into said washing machine, the heating mechanism for heating the water, the energization of the washer motor, and the washer drain pump, respectively, a first photosensitive resistor arranged to couple said first and second switching circuits to said source of supply voltage, first and second light sources connected to said first and second switching circuits, respectively, and optically coupled to said first photosensitive resistor so as to illuminate same in the operative state of said first and second switching circuits, respectively, a second photosensitive resistor electrically coupled to said third switching circuit so as to control the state thereof and optically coupled to said first and second light sources, optical coupling means responsive to the state of said third switching circuit for controlling the energization of said third relay means and the state of said fourth switching circuit, means coupling the output circuit of said first switching circuit to the input circuit of said second switching circuit, first water level sensing means coupled to the input circuit of said first switching circuit to control the state thereof, water temperature sensing means coupled to the input circuit of said second switching circuit to control the state thereof, timing means coupled to the input circuit of said third switching circuit to control the state thereof, second water level sensing means coupled to the input circuit of said fourth switching circuit to control the state thereof, and switch means for momentarily applying said supply voltage to said first switching circuit to start a wash program, said various sensing means, said timing means, and said light sources and photosensitive resistors being operative to successively cycle said switching circuits between their operative and rest states thereby to sequentially operate said first to fourth relay means to successively fill the washer with water, heat the water, energize the washer motor, and operate the drain pump to empty the water.

2. A controller as described in claim 1 wherein said timing means includes a capacitor connected in series with said second photosensitive resistor across said voltage source thereby to provide a short charge period for said capacitor in the illuminated condition of said second photosensitive resistor, a resistive discharge path for said capacitor having a time constant considerably longer than the charging time constant thereof in the illuminated state of said second photosensitive resistor, and means for applying the voltage across said capacitor to the input circuit of said third switching circuit to control the state thereof.

3. A controller as described in claim 1 wherein the coupling means between the output circuit of said first switching circuit and the input circuit of said second switching circuit comprises a unidirectionally conductive element.

4. A controller as described in claim 1 wherein said temperature sensing means comprises a temperature responsive resistor having a negative temperature coefficient and an adjustable resistor connected in series therewith across said voltage source.

5. A controller as described in claim 1 wherein said optical coupling means comprises, a third light source coupled to the output circuit of said third switching circuit, third and fourth photosensitive resistors optically coupled to said third light source, means connecting said third photosensitive resistor and said third relay means in circuit with said voltage source thereby to control the operation of said third relay means in response to the state of said third switching circuit, and means for coupling said fourth photosensitive resistor to the input circuit of said fourth switching circuit.

6. A controller as described in claim 5 wherein said first and second light sources are arranged to successively illuminate said second photosensitive resistor during the filling and heating cycles of said program, said second photosensitive resistor being responsive to said illumination to bias said third switching circuit into the operative state during said filling and heating cycles, said third light source being energized in the operative state of said third switching circuit so as to illuminate said third and fourth photosensitive resistors, said third photosensitive resistor being responsive to said illumination for energizing said third relay means to operate the washer motor and said fourth photosensitive resistor being responsive to said illumination for biasing said fourth switching circuit into the rest state thereby to hold said fourth relay means off.

7. A controller as described in claim 1 in which said switching circuits are biased during the filling cycle so that said first and third switching circuits are in the operative state and said second and fourth switching circuits are in the rest state, said first water level sensing means being operative to bias said first switching circuit from the operative state to the rest state when the water level in the washing machine reaches a given level, said coupling means thereupon applying a switching signal to said second switching circuit to switch same from the rest state to the operative state thereby to begin the heating cycle.

8. A controller as described in claim 1 further comprising a capacitor connected in series circuit with said first photosensitive resistor across said voltage source, and means for coupling the junction of said capacitor and said first photosensitive resistor to the input circuits of said first and second switching circuits to supply a voltage thereto during the transition period between filling and heating cycles.

9. A controller as described in claim 1 wherein said first and second light sources are connected in the output circuits of said first and second switching circuits, respectively, said timing means comprising a capacitor connected in series with said second photosensitive resistor across said voltage source and a resistor connected to said capacitor to provide a discharge path therefor, and means for coupling the junction of said capacitor and said second photosensitive resistor to the input circuit of said third switching circuit.

10. A program controller for actuating a washing machine through a cycle of successive operations comprising, a source of supply voltage, first, second, third and fourth switching circuits for successively controlling the filling, heating, washing and draining operations, respectively, of said washing machine, first, second third and fourth relay means individually coupled to the output circuits of said first, second, third and fourth switching circuits, respectively, and arranged to control the intake of water into said washing machine, the heating mechanism for heating the water, the energization of the washer motor, and the washer drain pump, respectively, a first photosensitive resistor arranged to couple said first and second switching circuits to said source of supply voltage, first and second light source connected to said first and second switching circuits, respectively, and optically coupled to said first photosensitive resistor so as to illuminate same in the operative state of said first and second switching circuits, respectively, a second photosensitive resistor electrically coupled to said third switching circuit so as to control the state thereof and optically coupled to said first and second light sources, optical coupling means responsive to the state of said third switching circuit for controlling the energization of said third delay means and the state of said fourth switching circuit, and switch means for momentarily applying said supply voltage to said first switching circuit to start a wash program, wherein said first, second, third and fourth switching circuits are sequentially operated by means of the optical coupling between said light sources and said photosensitive resistors, thereby to run the washing machine through said wash program comprising the successive steps of filling, heating, washing and draining.

References Cited

UNITED STATES PATENTS

| | | | |
|---|---|---|---|
| 2,086,157 | 7/1937 | Dumble | 68—12 X |
| 3,114,253 | 12/1963 | Morey et al. | 68—12 |
| 3,198,967 | 8/1965 | Roberts | 68—12 X |

WILLIAM I. PRICE, *Primary Examiner.*